(12) United States Patent
Hornick et al.

(10) Patent No.: US 7,496,460 B2
(45) Date of Patent: Feb. 24, 2009

(54) ENERGY SOURCE MONITORING AND CONTROL SYSTEM FOR POWER TOOLS

(75) Inventors: George Michael Hornick, Anderson, SC (US); Philip F. Minalga, Pendleton, SC (US); Daniel S. Soultanian, Easley, SC (US)

(73) Assignee: Eastway Fair Company Limited, Tortola (VG)

( * ) Notice: Subject to any disclaimer, the term of this patent is extended or adjusted under 35 U.S.C. 154(b) by 98 days.

(21) Appl. No.: 11/517,951

(22) Filed: Sep. 6, 2006
(Under 37 CFR 1.47)

(65) Prior Publication Data

US 2008/0059089 A1    Mar. 6, 2008

(51) Int. Cl.
*G01R 19/00* (2006.01)
*G01F 19/00* (2006.01)

(52) U.S. Cl. ........................................................ 702/64

(58) Field of Classification Search ................ 702/60, 702/61, 63, 64; 320/134, 136
See application file for complete search history.

(56) References Cited

U.S. PATENT DOCUMENTS

| | | | |
|---|---|---|---|
| 2,745,090 A | 5/1956 | Grillo |
| 3,808,534 A | 4/1974 | Summers et al. |
| 3,925,771 A | 12/1975 | Satake |
| 3,942,104 A | 3/1976 | Byrne |
| 4,198,597 A | 4/1980 | Sawyer |
| 4,424,491 A | 1/1984 | Bobbett et al. |
| 4,484,140 A | 11/1984 | Dieu |
| 4,567,476 A | 1/1986 | Lang |
| 4,622,508 A | 11/1986 | Matteau et al. |
| 4,698,578 A | 10/1987 | Mullersman et al. |
| 4,823,086 A | 4/1989 | Whitmire et al. |
| 5,027,294 A | 6/1991 | Fakruddin et al. |
| 5,028,858 A | 7/1991 | Schnizler et al. |
| 5,095,308 A | 3/1992 | Hewitt |
| 5,099,211 A | 3/1992 | Nowak |
| 5,155,428 A | 10/1992 | Kang |
| 5,159,257 A | 10/1992 | Oka et al. |
| 5,296,997 A | 3/1994 | Betton et al. |
| 5,332,958 A | 7/1994 | Sloan |
| 5,478,665 A | 12/1995 | Burroughs et al. |
| 5,493,197 A | 2/1996 | Eguchi et al. |
| 5,553,478 A | 9/1996 | Di Troia |

(Continued)

FOREIGN PATENT DOCUMENTS

DE      4430049 C1      3/1996

(Continued)

*Primary Examiner*—Michael P Nghiem
(74) *Attorney, Agent, or Firm*—Michael Best & Friedrich LLP (57) ABSTRACT

An energy source monitoring system evaluates the state of an energy source and responsively controls a power tool or other device. The energy source may be a power tool battery pack that includes multiple individual battery packs connected in series. The energy source monitoring system may be incorporated into a power tool, screwdriver, flashlight, audio and/or video player, or any other device. The energy source monitoring system intelligently exercises control over the power applied to the device. In one implementation, the energy source monitoring system detects when voltages in the energy source have fallen below a cutoff level, yet allows the device to continue running until the operator finishes the current device operation.

21 Claims, 8 Drawing Sheets

U.S. PATENT DOCUMENTS

| | | | |
|---|---|---|---|
| 5,617,285 A | 4/1997 | Zitta | |
| 5,633,592 A | 5/1997 | Lang | |
| 5,652,501 A | 7/1997 | McClure et al. | |
| 5,805,068 A | 9/1998 | Bradus | |
| 5,838,139 A | 11/1998 | Greene | |
| 5,838,140 A | 11/1998 | Rosenthal | |
| 5,894,212 A | 4/1999 | Balogh | |
| 5,896,025 A | 4/1999 | Yamaguchi et al. | |
| 5,929,603 A | 7/1999 | Nakao et al. | |
| 5,969,600 A | 10/1999 | Tanguay | |
| 5,973,497 A | 10/1999 | Bergk et al. | |
| 5,990,664 A | 11/1999 | Rahman | |
| 6,046,575 A | 4/2000 | Demuro | |
| 6,051,955 A | 4/2000 | Saeki et al. | |
| 6,081,099 A | 6/2000 | Shimioda | |
| 6,118,253 A | 9/2000 | Mukainakano et al. | |
| 6,157,165 A | 12/2000 | Kinoshita et al. | |
| 6,172,485 B1 | 1/2001 | Fujita et al. | |
| 6,268,710 B1 | 7/2001 | Koga | |
| 6,396,243 B2 | 5/2002 | Odaohhara | |
| 6,492,791 B1 | 12/2002 | Saeki et al. | |
| 6,882,942 B1 | 4/2005 | Duduman | |
| 6,885,168 B2 | 4/2005 | Okumura et al. | |
| 6,888,468 B2 | 5/2005 | Bertness | |
| 6,894,600 B2 | 5/2005 | Phelan | |
| 6,950,030 B2 | 9/2005 | Kovarik et al. | |
| 6,960,899 B2 | 11/2005 | Kobayashi et al. | |
| 6,977,482 B2 | 12/2005 | Popescu-Stanesti et al. | |
| 7,034,475 B2 | 4/2006 | Kato et al. | |
| 7,102,684 B1 | 9/2006 | Higuchi et al. | |
| 7,183,746 B1 | 2/2007 | Carter | |
| 7,199,556 B1 | 4/2007 | Benckenstein, Jr. et al. | |
| 2002/0057073 A1* | 5/2002 | Kitagawa | 320/135 |
| 2003/0095315 A1* | 5/2003 | Hoshide | 359/189 |
| 2003/0096158 A1 | 5/2003 | Takano et al. | |
| 2004/0046673 A1 | 3/2004 | Kovarik et al. | |
| 2005/0248351 A1 | 11/2005 | Graf | |
| 2006/0006841 A1 | 1/2006 | Lee | |
| 2006/0017444 A1 | 1/2006 | Fechalos et al. | |
| 2006/0071643 A1 | 4/2006 | Carrier et al. | |
| 2006/0074512 A1* | 4/2006 | Minalga et al. | 700/172 |
| 2006/0091854 A1 | 5/2006 | Chen et al. | |
| 2006/0097696 A1 | 5/2006 | Studyvin et al. | |
| 2006/0132093 A1* | 6/2006 | Nguyen | 320/132 |
| 2006/0220652 A1 | 10/2006 | Keppeler | |
| 2006/0226844 A1 | 10/2006 | Broad | |
| 2006/0250137 A1 | 11/2006 | Frey et al. | |
| 2006/0267551 A1 | 11/2006 | Sutardja | |
| 2007/0029968 A1 | 2/2007 | Costello et al. | |
| 2007/0063672 A1 | 3/2007 | Wiesner et al. | |
| 2008/0059000 A1* | 3/2008 | Hornick et al. | 700/297 |

FOREIGN PATENT DOCUMENTS

| | | |
|---|---|---|
| DE | 20112152 U1 | 10/2002 |
| DE | 10222146 A1 | 2/2003 |
| DE | 10254223 A1 | 7/2003 |
| DE | 20308792 U1 | 11/2003 |
| DE | 10338082 A1 | 4/2004 |
| DE | 102004022556 B3 | 10/2005 |
| EP | 0110466 A1 | 6/1984 |
| EP | 0207054 A2 | 5/1986 |
| EP | 0115625 B1 | 4/1987 |
| EP | 0248461 A1 | 12/1987 |
| EP | 0355461 A2 | 2/1990 |
| EP | 0423918 A2 | 4/1991 |
| EP | 0442151 A1 | 8/1991 |
| EP | 0207054 B1 | 7/1992 |
| EP | 0550389 A1 | 7/1993 |
| EP | 0248461 B2 | 5/1994 |
| EP | 0423918 B1 | 7/1994 |
| EP | 0628834 A1 | 12/1994 |
| EP | 0673512 | 9/1995 |
| EP | 0693691 A2 | 1/1996 |
| EP | 0709944 A1 | 5/1996 |
| EP | 0673512 B1 | 2/1997 |
| EP | 0676835 B1 | 1/2002 |
| EP | 0678751 B1 | 9/2002 |
| EP | 0863598 B1 | 9/2003 |
| EP | 1066536 B1 | 12/2004 |
| EP | 1185876 B1 | 1/2005 |
| EP | 1185875 B1 | 10/2005 |
| EP | 1637897 A2 | 3/2006 |
| EP | 1652624 A2 | 5/2006 |
| EP | 0964258 B1 | 11/2006 |
| GB | 1537500 | 12/1978 |
| GB | 2076166 | 11/1981 |
| GB | 2215851 A | 9/1989 |
| GB | 2241342 A | 8/1991 |
| GB | 2258736 A | 2/1993 |
| GB | 2261958 A | 6/1993 |
| GB | 2278922 A | 12/1994 |
| GB | 2296777 A | 7/1996 |
| GB | 2371688 A | 7/2002 |
| WO | WO 96/24170 | 8/1996 |
| WO | WO 00/52807 | 9/2000 |
| WO | WO 00/63712 | 10/2000 |
| WO | WO 00/72028 A1 | 11/2000 |
| WO | WO 00/76017 A1 | 12/2000 |
| WO | WO 2006/041751 A2 | 4/2006 |
| WO | WO 2006/052066 A1 | 5/2006 |
| WO | WO 2006/052354 A2 | 5/2006 |

* cited by examiner

ENERGY SOURCE MONITORING AND CONTROL SYSTEM FOR POWER TOOLS

BACKGROUND OF THE INVENTION

1. Technical Field

The invention relates to energy source management and device control for power tools and other devices. More specifically, this invention relates to monitoring an energy source, such as multiple series connected batteries, and responsively controlling power supplied to the device.

2. Related Art

The form, function, and application of power tools are extremely diverse. Coupled with the recent growth in the popularity of do-it-yourself hardware stores, power tools are found just as often in the hands of the everyday consumer as the professional contractor. Regardless of the form or application of the tool, however, the operator expects the power tool to reliably operate and consistently deliver a quality finished product.

In particular, battery operated tools are highly susceptible to fluctuations in battery voltage. Accordingly, in the past, circuitry has been provided to watch the battery voltage. In some cases, the batteries were automatically disconnected from the load when the battery voltage fell too low. Automatically disconnecting the batteries undesirably interrupts the operation of the tool. On the other hand, continued operation of the tool may over discharge and potentially damage the batteries.

Therefore, a need exists for an improved energy source monitoring and control system.

SUMMARY

A power tool energy source monitoring and control system includes a main power switch through which, for example, series connected batteries B1 and B2 supply power to a power tool motor voltage input. A switch state control input connects to the main power switch and may be used to hold the main power switch 'ON', or to release the main power switch so that it turns 'OFF'. In addition, the system includes voltage measurement logic which determines a first battery voltage V1 of B1 and a second battery voltage V2 of B2.

Comparison logic determines whether a cutoff condition exists. In particular, the cutoff condition may exist when V1, V2, or both V1 and V2 fade below a cutoff threshold for disconnecting the batteries and stopping power tool operation. Nevertheless, switch control logic uses the switch state control input to hold the power switch in an 'ON' state for an extension time despite the determination of the cutoff condition. The extension time period may correspond to the duration that a trigger switch is depressed, for example. In other words, the energy source monitoring and control system allows the tool operator to complete a current tool operation (e.g., a miter saw cut) despite the fading battery level. As a result, the tool is not abruptly disabled, leaving the current tool operation only partially completed.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
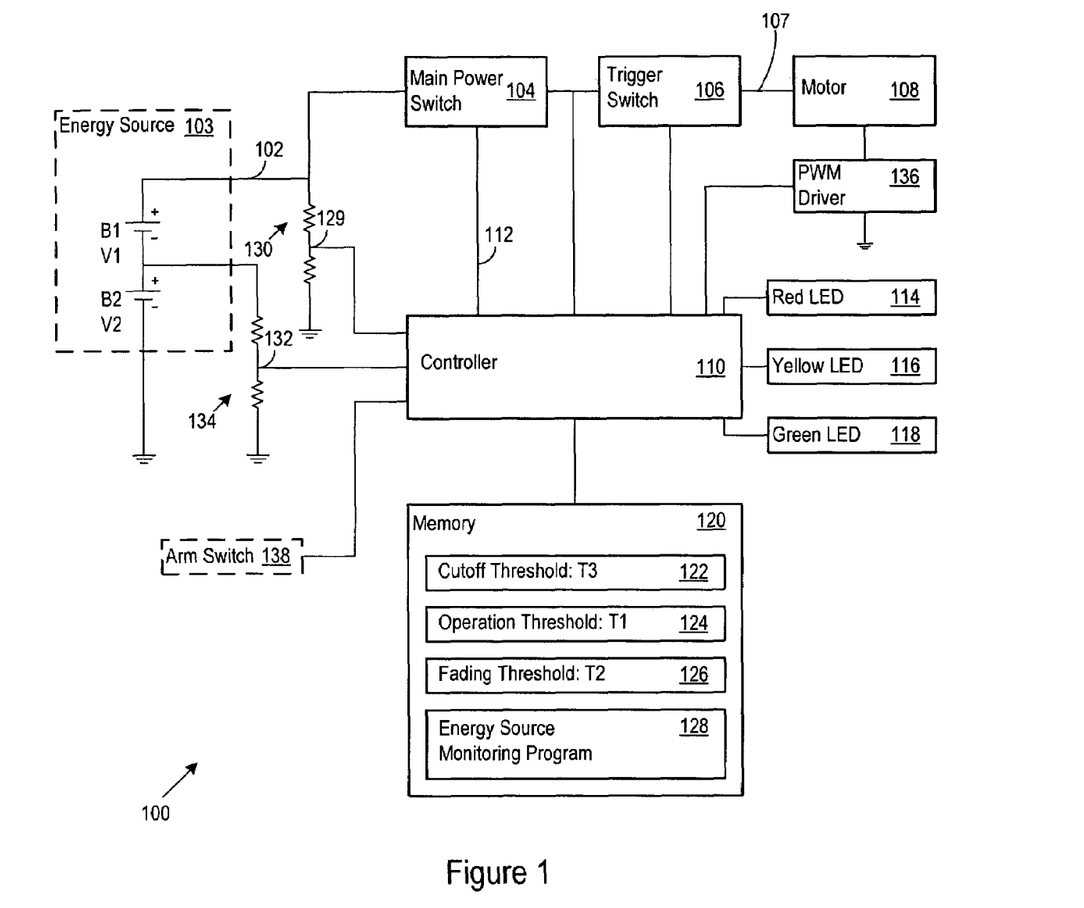
FIG. 1 shows an energy source monitoring and control system.

In FIG. 1, a power tool energy source monitoring and control system 100 includes an energy source input 102, a main power switch 104, and a trigger switch 106 which connects to a motor 108. The energy source input 102 connects to a energy source 103. The energy source 103 may vary widely in implementation, and may be, as one example, a power tool battery pack that includes multiple individual battery packs in series. More specifically, the energy source 103 may be a battery pack nominally rated at 36 V including two individual battery packs (or other energy sources) connected in series, with each individual battery pack rated at 18 V. The individual battery packs may themselves include multiple energy sources in series (e.g., 15 battery cells in series, each nominally rated at 1.2 V).

The discussion below refers to two batteries B1 and B2 (with voltages V1 and V2) in series as an example of the energy source 103. However, as noted above, the energy source 103 may be implemented with individual battery packs, individual battery cells, fuel cells, capacitors, or other energy sources.

The batteries B1 and B2 provide power to a motor voltage input 107 through the main power switch 104 and the trigger switch 106. A controller 110 connects to the main power switch 104 through the switch state control input 112 and also connects to the trigger switch 106. The controller 110 provides energy source monitoring and control feedback to the operator through indicators. In the example show in FIG. 1, the indicators include a Red LED 114 (e.g., a cutoff indicator), a Yellow LED 116 (e.g., a warning indicator), and a Green LED 118 (e.g., an operational indicator), although any other type or number of indicators may be employed. The indicators may signal whether the battery voltages V1 and V2 of B1 and B2 are above or below certain thresholds as described below.

The controller 110 connects to a memory 120. The memory stores a cutoff threshold 122, an operation threshold 124, and a fading threshold 126. In addition, the memory includes an energy source monitoring and control program 128, which will be described in more detail below.

The cutoff threshold 122 establishes a voltage (e.g., with respect to B1 or B2 individually) below which the batteries should be disconnected from the load (thereby stopping device operation), and preventing additional battery discharge. The cutoff threshold 122 may be a percentage or ratio of the energy source voltage (e.g. a battery pack voltage). In one implementation, the ratio may be approximately 0.667. For an 18 V battery pack, the cutoff threshold 122 may then be approximately 12 V. The operation threshold 124 establishes a voltage above which both B1 and B2 should be before the power tool is allowed to start. The operation threshold 124 may also be a percentage or ratio of the energy source voltage. In one implementation, the ratio may be approximately 0.945. For an 18 V battery pack, the operation threshold 124 may then be approximately 17 V. The fading threshold 126 establishes a voltage (with respect to B1 or B2 individually) below which the operator should be warned about fading battery voltage. The fading threshold 126 may be a percentage or ratio of the energy source voltage, such as 0.833. For an 18 V battery pack, the fading threshold 126 may then be approximately 15 V.

The thresholds 122, 124, and 126 may vary widely depending on the power tool and the implementation of the system 100. The thresholds 122, 124, and 126 may be set according to the ratios noted above or any other ratios, may be individually manually selected, or may be determined in many other ways whether or not based on a nominal energy source voltage. Furthermore, additional thresholds may be defined and applied by the controller 110 to determine when the energy source has reached any other state of charge or discharge. For example, the thresholds may additionally or alternatively include thresholds set to correspond to 25%, 50%, 75%, and 100% of nominal energy source voltage and/or the nominal series connected battery voltages that implement the energy source. As another example, one or more of the thresholds may be set to correspond to an expected remaining run-time, given the known characteristics of the energy source. In one implementation, the cutoff threshold 122 corresponds to a voltage at which 25 percent of the full run-time remains, the fading threshold 126 corresponds to a voltage at which 50 percent of the full run-time remains, and the operation threshold corresponds to a voltage at which 75 percent of the full run-time remains. Additional, fewer, or different thresholds may be set. The system 100 may also incorporate additional indicators to provide feedback to the operator regarding the state of the energy source with regard to the additional thresholds.

The controller 110 connects to a first voltage measurement point 129 formed by the voltage divider 130 across the series connection of batteries B1 and B2. The controller 110 also connects to a second voltage measurement point 132 formed by the voltage divider 134 connected across the battery B2. In one implementation, the voltage divider 130 provides a measured voltage, M1, of approximately (1/10)(V1+V2) on a controller input pin. Similarly, the voltage divider 134 provides a measured voltage, M2, of approximately (1/10) V2 on another controller input pin. The controller 110 may include voltage measurement logic in the form of analog to digital converter logic, for example, which converts the analog voltages to digital representations. The controller may determine V1 and V2 according to:

$$V2 = 10 * M2$$

$$V1 = 10 * (M1 - M2)$$

In the example shown in FIG. 1, the energy source input 102 connects to an energy source 103 which includes two series connected batteries, B1 and B2. The energy source 103 connects to the motor 108 through the main power switch 104 and the trigger switch 106. When the operator presses the main power switch 104, power is applied to the controller 110. The controller 110 holds the main power switch 104 in the closed state while the controller 110 performs an initial check of the battery voltages. To that end, the controller 110 asserts the switch state control input 112 to energize a solenoid which holds the main power switch 104 in the 'ON' state or releases the main power switch to the 'OFF' state. Thus, the main power switch 104 may be a dropout switch with an 'ON'/'OFF' state under control of the controller 110 and the switch state control input 112.

The main power switch 104 and 'ON'/'OFF' state control may be implemented in other ways, however. For example, a separate electronic switch (e.g., a transistor such as a Field Effect Transistor (FET), a relay, or other electronic switch) may be placed in-line with the motor 108. The controller 110 may connect to and control the electronic switch through a switch state control input (e.g., a control input connected to the gate of the FET). The controller 110 may then exercise 'ON'/'OFF' state control using the electronic switch. The main power switch 104 may then be replaced with a switch that does not directly include an 'ON'/'OFF' state control input, such as a momentary switch through which power is supplied to the controller 110, or through which a wakeup signal, interrupt signal, or other signal is applied the controller 110.

Figure 6:
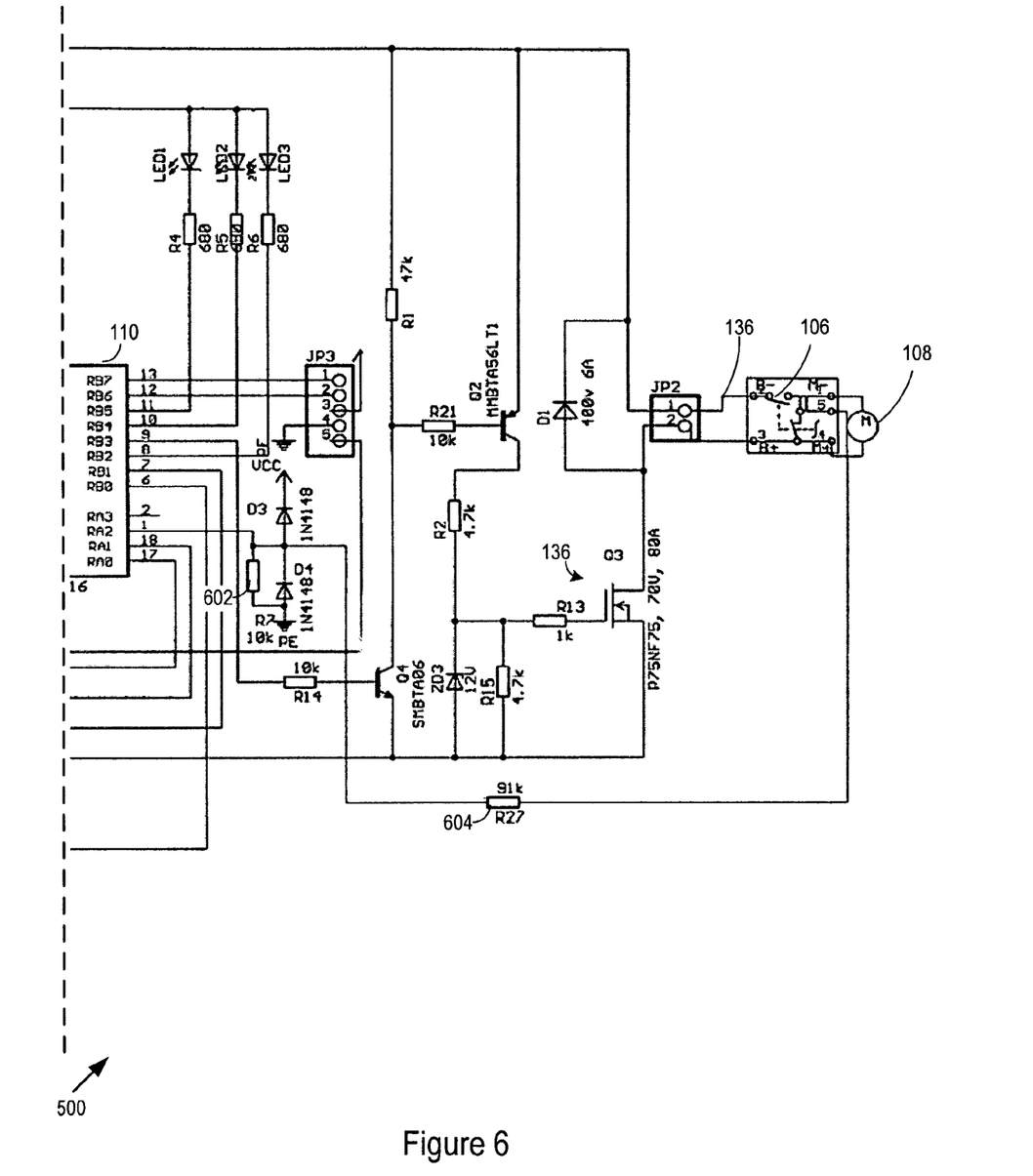
FIG. 6 shows a portion of a detail schematic for an energy source monitoring and control system for a power tool.

The controller 110 individually monitors the battery voltages V1 and V2 and determines whether to hold the main power switch 104 in a closed state. In addition, the controller 110 provides status and warning indicators about the voltage levels of the batteries to the operator through the LEDs 114, 116, and 118. The separate trigger switch 106 connects to the controller 110 and provides a signal to the controller 110 that the operator is attempting to start the motor 108. In one implementation, a trigger switch state sensing circuit is connected to the trigger switch 106 and the controller 110. An example of the sensing circuit is shown in FIG. 6 and discussed in more detail below. The sensing circuit provides a signal to the controller 110 that indicates whether the trigger switch 106 is pressed or is not pressed. The controller 110 may thereby determine whether the power tool is currently performing an operation, such as cutting a piece of wood. Optionally, the control system 100 may incorporate a current sensing circuit that provides feedback to the controller 110 about the existing motor load. The controller 110 may use the current sensing circuit as an additional or different indicator that the motor is operating and that the power tool is currently performing an operation. The controller 110 may also make control decisions based on other input. For example, in the context of a miter saw, the controller 110 may connect to an arm switch 138. As will be explained in more detail below, the arms switch 138 provides an arm state signal to the controller 110 so that the controller 110 may monitor whether the arm is up or down.

More specifically, when the main power switch 104 is first engaged, power is applied to the controller 110. The controller 110 holds the main power switch 104 in the engaged state using the switch state control input 112 to energize a solenoid in the main power switch 104. The controller 110 next determines whether V1 or V2 is less than the operation threshold 124 (e.g., approximately 17 V). If so, the controller 110 illuminates the Red LED 114, flashes the Yellow LED 116, prevents the motor 108 from starting, and shuts off the main power switch 104 after a pre-established delay (e.g., 15 seconds). If both V1 and V2 are above the operation threshold 124, then the controller 110 will illuminate the Green LED 118 and allow the motor 108 to start when the operator presses the trigger switch 106. The controller 110 exercises Pulse Width Modulated (PWM) control over the motor 108 using the PWM driver 136 and motor 108 in response to the trigger switch 106 to adjust the motor speed. For example, the trigger switch 106 may be an 'ON'/'OFF' state switch or a variable displacement switch (e.g., a drill speed or screwdriver trigger switch).

Once the motor 108 starts, the controller 110 intelligently exercises control over the motor 108. Thus, even if the battery voltages V1 or V2 begin to fade, the controller 110 allows the motor to continue running for an extension time which, for example, allows the operator to finish a current tool operation (e.g., to finish a miter saw cut) before disconnecting the batteries. For example, when V1 or V2 fades below the fading threshold 126 (e.g., approximately 15 V), the controller 110 flashes the Yellow LED 116 to indicate that battery charge is fading. In this case, if the operator releases the trigger switch 106 and the load is removed from the batteries, the controller 110 will allow the motor to restart if both battery voltages rise above the operation threshold.

If V1 or V2 fade below the cutoff threshold 122 (e.g., approximately 12 V) while the motor 108 is running, the controller 110 flashes the Yellow LED 116 to signal battery discharge. Under these conditions, a cutoff condition exists in which it is generally desirable to disconnect the batteries and cutoff the motor operation 108 to prevent additional battery discharge. Nevertheless, the controller 110 allows the motor 108 to continue running for an extension time. The extension time allows, for example, the operator to complete the current tool operation (e.g., a miter saw cut) before cutting off the motor 108. When the operator releases the trigger switch 106, however, the controller 110 stops the motor 108, illuminates the Red LED 114 to signal significant battery discharge, continues to flash the Yellow LED 116, and automatically turns off the main power switch 104 after a delay (e.g., 15 seconds). Accordingly, the batteries are automatically disconnected from the device (e.g., from the power tool motor 108). The controller 110 may also prevent motor restart until the battery voltages V1 and V2 have risen back above the operation threshold 124.

Figure 2:
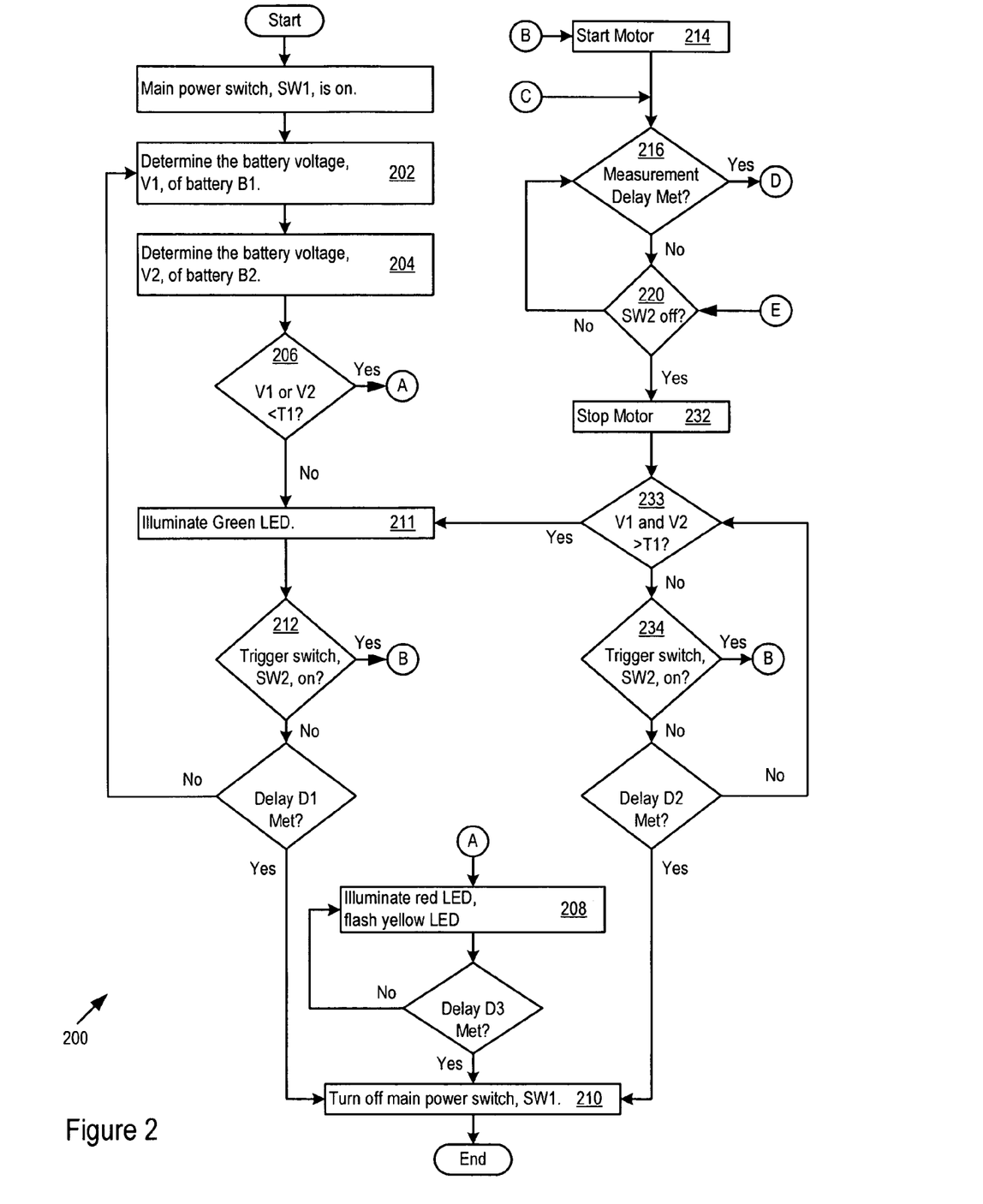
FIG. 2 shows a portion of a flow diagram for energy source monitoring and control.

FIG. 2 shows a portion of a flow diagram 200 of the acts which may be taken by the energy source monitoring and control system 100, including the energy source monitoring program 128. The controller 110 and the energy source monitoring program 128 implement voltage comparison logic, switch control logic (e.g., to control the main power switch 104), and tool startup and restart logic. Operation starts when the operator depresses the main power switch 104. Power is thereby applied to the controller 110, which, after initialization, determines the battery voltage V1 of battery B1 (Act 202). The controller 110 also determines the battery voltage V2 of battery B2 (Act 204). The controller 110 then determines whether V1, V2, or both V1 and V2 fall below the operation threshold 124 (labeled "T1" in FIG. 2) (Act 206).

If V1 or V2 or both fall below the operation threshold 124, the controller 110 illuminates the red LED 114 and flashes the yellow LED 116 (Act 208). These indicators persist for a predefined delay D3 (e.g., 15 seconds). After the delay has expired the controller 110 turns off the main power switch 104 (Act 210). In doing so, the controller 110 may de-assert the switch state control input 112 to disengage the main power switch 104 and thereby interrupt the application of power from the energy source to the motor 108.

On the other hand, when both V1 and V2 are above the operation threshold 124, the controller 110 illuminates the Green LED 118 (Act 211). The Green LED 118 signifies that the power tool is ready for operation and that the batteries are sufficiently charged (i.e., above the operational threshold 124). The controller 110 determines whether the trigger switch 106 has been depressed (Act 212). If not, the controller 110 continues to check battery voltages V1 and V2 (Acts 202 and 204) for a predefined delay D1 (e.g., 6 minutes). However after the delay D1 has expired, the controller 110 turns off the main power switch 104 using the switch state control input 112 (Act 210).

When V1 and V2 exceed the operation threshold 124 and when the trigger switch 106 is depressed (Act 212), the controller 110 starts the motor 108 (Act 214) using, for example, pulse width modulation control responsive to the trigger switch 106. During motor operation, the controller 110 periodically measures the battery voltages V1 and V2. Accordingly, if the measurement delay has been met (Act 216), the controller 110 proceeds to determine whether V1 or V2 has fallen below the fading threshold 126, labeled "T2" in FIG. 3 (Act 216). If not, the controller 110 continues to illuminate the Green LED 118 (Act 218) and determines whether the trigger switch 106 is now off (Act 220). If the trigger switch 106 is not off, the controller 110 continues to measure the battery voltages V1 and V2.

Figure 3:
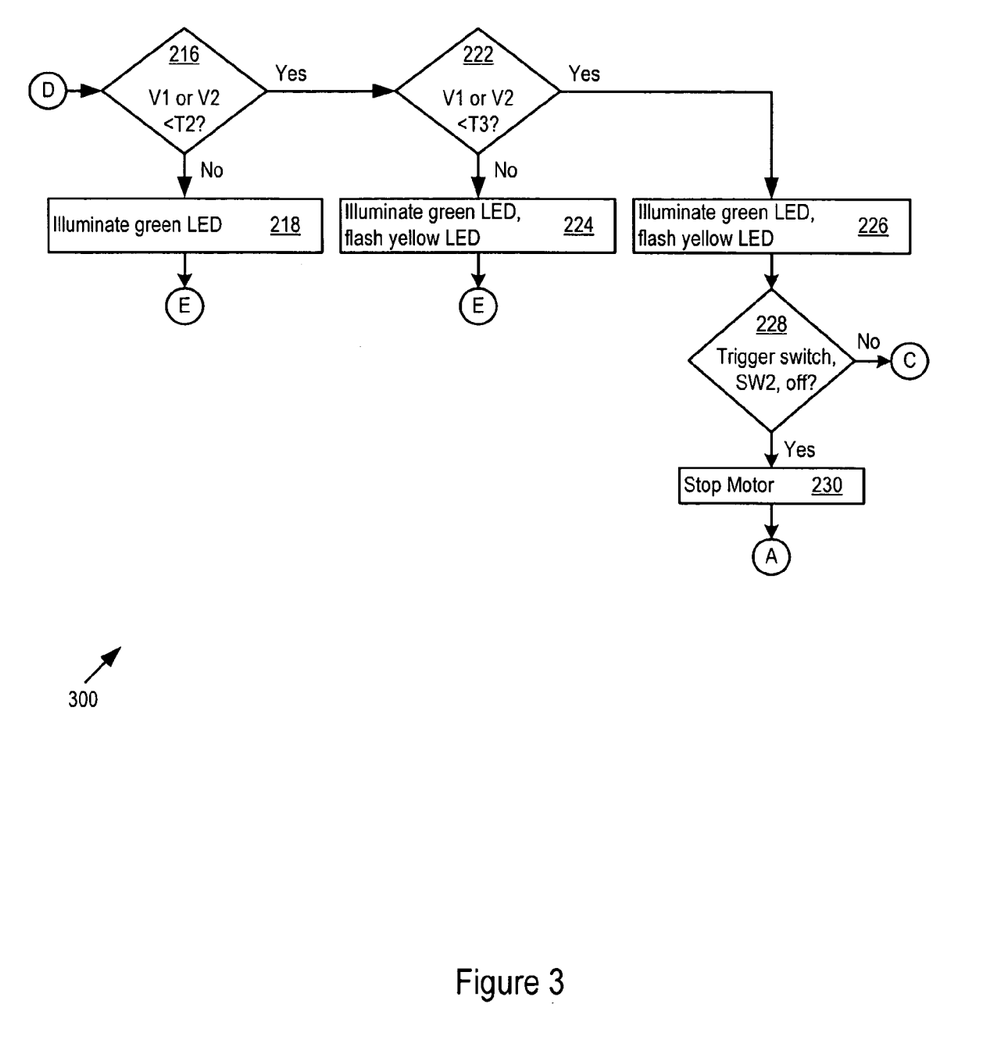
FIG. 3 shows a portion of a flow diagram for energy source monitoring and control.

If V1 or V2 have fallen below the fading threshold 126 but have not fallen below the cutoff threshold 122, labeled "T3" in FIG. 3 (Act 222), the controller 110 continues to illuminate the Green LED 118 but flashes the yellow LED 116 (Act 224). The controller 110 thereby provides a warning that battery voltage is beginning to fade. Similarly, if V1 or V2 has fallen below the cutoff threshold 122, the controller 110 illuminates the Green LED 118 and flashes a yellow LED 116 (Act 226). If the trigger switch 106 remains on, the controller 110 continues to monitor the battery voltages. However, if the trigger switch 106 is off, the controller 110 stops the motor 108 (Act 230). Furthermore the controller 110 then illuminates the red LED 114 and flashes the yellow LED 116 to indicate significant fading of the battery voltages (Act 208). The red LED 114 and yellow LED 116 continue to be illuminated until the delay D3 (e.g., 15 seconds) is met. After the delay, the controller 110 automatically turns off the main power switch 104. As a result, controller 110 prevents the power tool from restarting until the battery voltages have recovered to be above the operational threshold 124. At the same time however, the controller 110 has allowed the power tool to finish its current operation. For example the power tool may continue operation while the trigger switch 106 is depressed. In other implementations, the controller 110 may allow the motor 108 to continue running for any other extension period (e.g., a predefined time such as 1-10 seconds) before automatically turning off the main power switch 104. In addition to allowing the operator to finish the cut, the controller 110 also helps to avoid undesirable effects stemming from abrupt interruptions of the tool operation. In the context of a miter saw, for example, one beneficial result is that the controller 110 helps to eliminate jamming of the cutting blade in a workpiece (e.g., a piece of wood) which may occur if power is suddenly removed while the power tool is cutting the workpiece.

With reference again to FIG. 2, when the controller 110 determines that the trigger switch 106 is off (Act 220), the controller 110 stops the motor 108 (Act 232). The controller 110 then determines whether V1 and V2 exceed the operation threshold 124 (Act 233). If so, the controller 110 illuminates the Green LED (Act 211) and processing continues as described above. Otherwise, the controller 110 determines whether the trigger switch 106 has again been depressed (Act 234), and if so, starts the motor 108 (Act 214). On the other hand, when the trigger switch 106 is not depressed and a predetermined delay D1 (e.g., 6 minutes) has expired, then the controller 110 turns off the main power switch 104 (Act 210).

In one implementation, the energy source monitoring and control circuitry 100 is incorporated into a miter saw. The miter saw arm may provide an arm switch that is in a given state (e.g., closed or open.) when the arm is in a given position (e.g., up or down). The arm switch thereby provides additional information about the state of the miter saw that the controller 110 may use to make motor control decisions. In addition, the trigger switch 106 may further control a motor braking function by providing a brake contact. The brake contact shorts the motor winding so that the motor and the tool (e.g., a cutting blade) driven by the motor slows down faster after the trigger switch is released.

Figure 4:
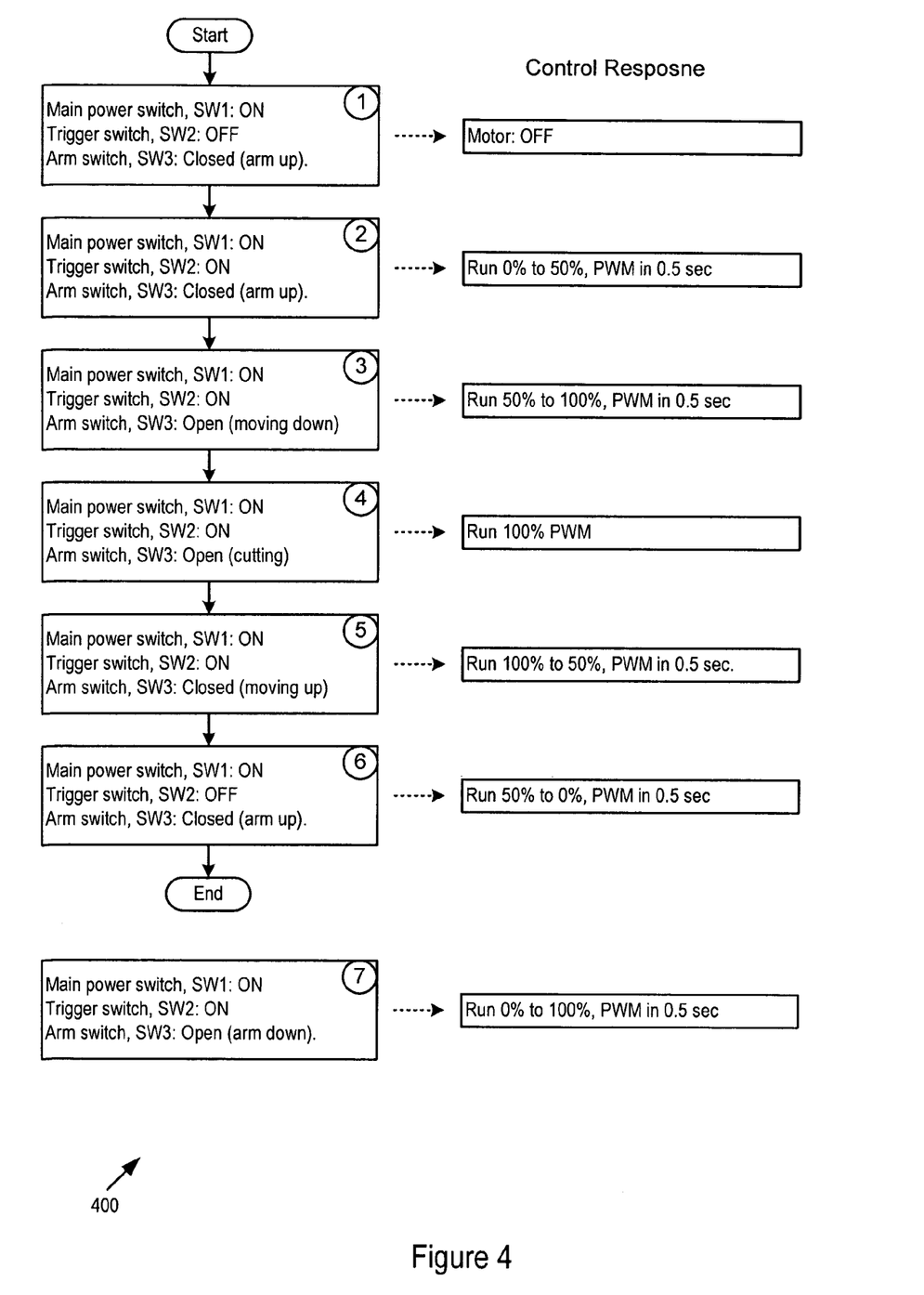
FIG. 4 shows a flow diagram of energy source monitoring and control for a miter saw.

The controller 110 may exercise control over the miter saw as shown in Table 1 below. FIG. 4 shows a corresponding operational state sequence and control response directed by the controller 110 in which the miter saw, starting from an arm up rest state, makes a cut and returns to the arm up rest state. The arm of the miter saw includes an arm switch 138 (labeled SW3 in Table 1) that provides an arm state signal to the controller 110. The arm switch 138 is connected to the controller 110 and the controller 110 monitors the arm state. When the arm is up, for example, the arm switch 138 may be closed, and when the arm is down, the arm switch 138 may be open. The controller 110 monitors the history of the arm state signal and the arm switch 138 to ascertain the operational state and changes to the operational state of the miter saw (e.g., as shown in Table 1). For example, when the miter saw transitions from a state in which the arm switch 138 is closed and the trigger switch is open to a state in which the arm switch 138 is open and the trigger switch is closed, the controller 110 may ascertain that the operator has initially depressed the trigger switch to start the blade in preparation for making a cut. The operational states and their transitions are explained in more detail below:

time period of 0.5 sec. Because the miter saw arm is still up, the controller 110 limits the speed to 50%. Significant battery power is saved by limiting the speed when the arm is up and the operator is not ready to make a cut.

Operational State 3: The miter saw arm transitions away from the up position (e.g., the arm is moving down to make the cut). As a result, the arm switch opens. The controller 110 responsively increases the speed of the motor 108 from 50% to 100% over the reaction time period of 0.5 sec. Accordingly, the blade contacts the material at full speed.

Operational State 4: The miter saw arms is down and the blade is cutting. The controller 110 runs the blade at full speed.

Operational State 5: The cut is done. The controller 110 may determine that the cut is finished by determining that the motor current has dropped. For example, the controller 110 may determine that the motor current has dropped to approximately a pre-determined no-load current. The controller 110 reduces the motor speed from 100% to 50% over a reaction time of 0.5 sec. (e.g., under the assumption that the arm is moving up after the cut).

Operational State 6: The cut is done and the trigger switch 106 is released. Accordingly, the controller 110 reduces the motor speed further from 50% to 0% over a reaction time of 0.5 sec.

Operational State 7: In this state, the arm is assumed to be in the down position. When the trigger switch is depressed, the controller 110 will run the motor from 0% to 100% under PWM control over a reaction time of 1.0 seconds so that the miter saw may make the cut.

Figure 5:
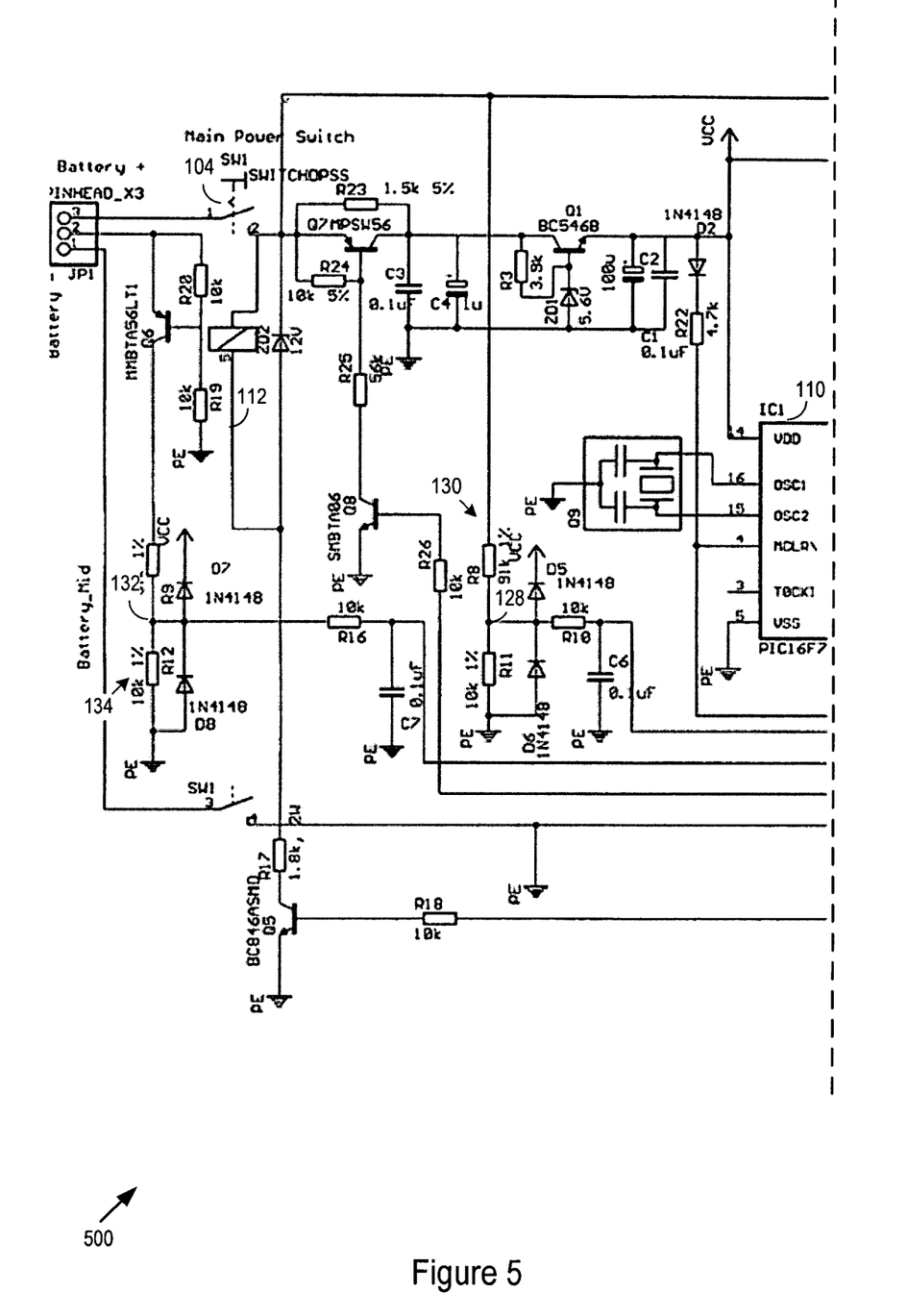
FIG. 5 shows a portion of a detailed schematic for an energy source monitoring and control system for a power tool.

FIGS. 5 and 6 show a detailed schematic of an energy source monitoring and control system 500 for a power tool or other device. The controller 110 includes an onboard memory which stores the energy source monitoring program and thresholds, and which exercises energy source monitoring and control for the power tool. A Field Effect Transistor (FET) is provided as part of the pulse width modulated driver 136. Optionally, a current sensing resistor may be added in the source or drain leg of the FET, and connected to an input pin (e.g., an A/D converter input) on the controller 110. The controller 110 may then determine the current flow through the motor, and make control decisions using the current flow as an additional parameter.

TABLE 1

| Arm Position | SW1 (Main) | SW2 (Trigger) | SW3 (Arm) | Motor Control | Reaction Time | Operational State: |
|---|---|---|---|---|---|---|
| Stationary Up | Closed | Open | Closed | Off | None | 1 |
| Stationary Up | Closed | Closed | Closed | Run 0%-50% PWM | 0.5 Sec | 2 |
| Moving Down | Closed | Closed | Open | Run 50%-100% PWM | 0.5 Sec | 3 |
| Cutting | Closed | Closed | Open | Run 100% PWM | NA | 4 |
| Moving Up | Closed | Closed | Closed | Run 100%-50% PWM | 0.5 Sec | 5 |
| Moving Up | Closed | Open | Closed | Run 50%-0% PWM | 0.5 Sec | 6 |
| Down | Closed | Closed | Open | Run 0-100% PWM | 1.0 Sec | 7 |

Operational State 1: The trigger switch 106 is open and the controller 110 does not run the motor 108. The miter saw arm position is in the stationary up position, and the arm switch is therefore closed.

Operational State 2: The miter saw arm position is in the stationary up position, but the trigger switch 106 is closed. In response, the controller 110 begins to run the motor 108. In particular, the controller 110 uses the PWM driver 136 to run the motor 108 from 0% speed to 50% speed over the reaction FIG. 6 also shows a trigger switch state sensing circuit which includes the resistor 602 and resistor 604. When the trigger switch 106 is open, the resistor 602 pulls the input pin RA2 to ground. When the trigger switch 106 is closed and the motor is operating, current flows through the resistors 602 and 604. As a result, a voltage that depends on the current flow is present across the resistor 602 and present on the input pin RA2. By sensing the voltage on the input pin RA2, the controller 110 determines whether the trigger switch 106 is depressed and may thereby determine that the power tool is currently in operation.

Although the example above described a miter saw, it is noted that the energy source monitoring and control system 100 is applicable to any other type of power tool, whether or not it is a benchtop power tool. As examples, the system 100 may be incorporated into drills, hammers, grinders, sanders and planers, routers, heat guns, nailers, bench grinders, band saws, shears, nibblers, polishers and finishers, laser levels, table saws, circular saws, reciprocating saws, plate joiners, hand planers, laminate trimmers, or any other type of power tool. Furthermore, the energy source monitoring and control system may be incorporated into virtually any device to provide intelligent control which allows the device to complete a current operation before removing power.

Figure 7:
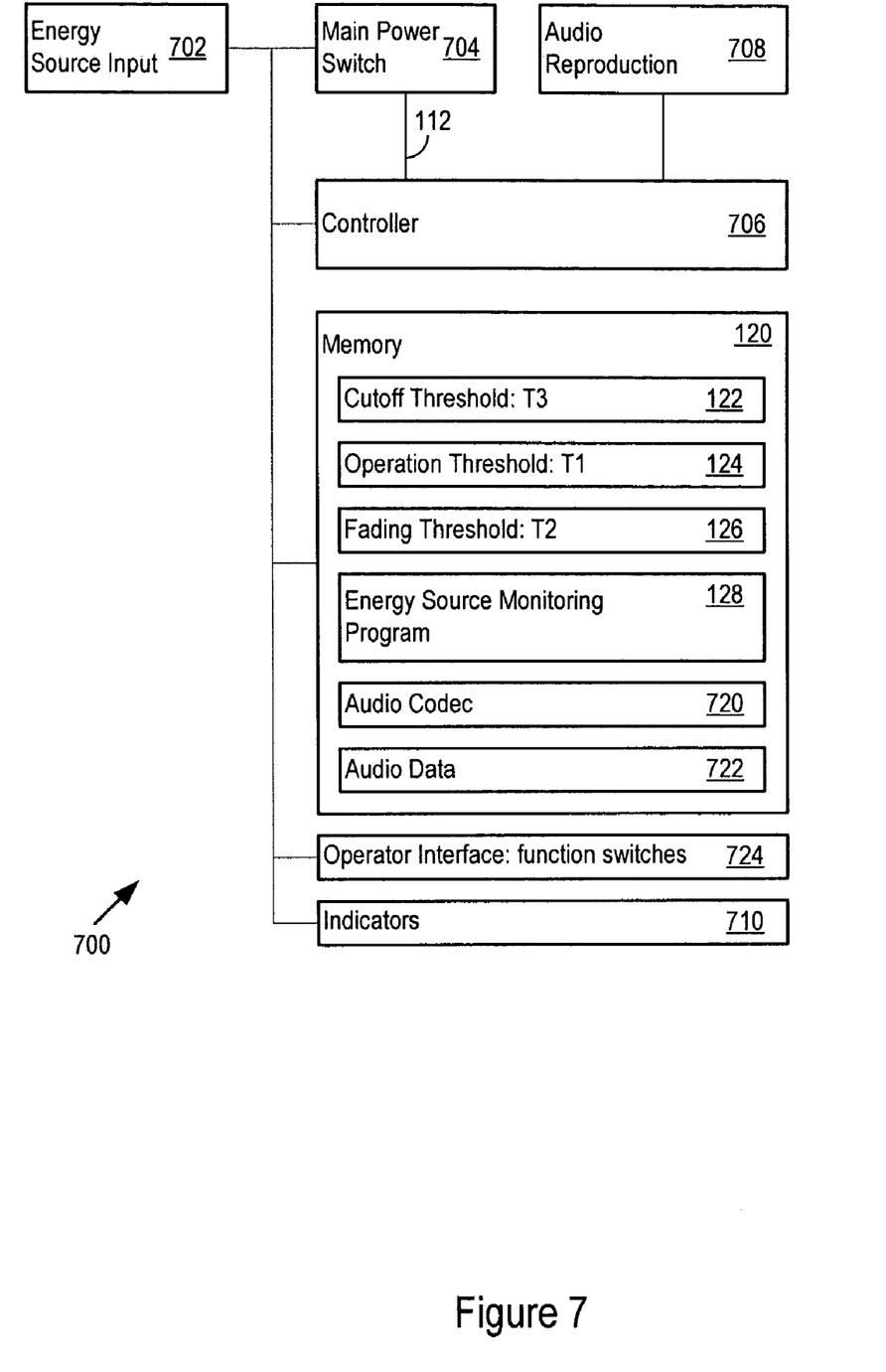
FIG. 7 shows a portable music player incorporating an energy source monitoring system.

FIG. 7 shows an example of a portable music device 700 which incorporates an energy source monitoring and control system. In particular, the portable music device 700 accepts power from the energy source input 702 which is connected to the controller 706 and a main power switch 704 (e.g., a dropout switch). The energy source input 702 may, for example, connect battery power (e.g., series connected batteries B1 and B2) to circuitry in the portable music device 700. An audio reproduction system 708 connects to the controller 706. The audio reproduction system 708 may include speakers, amplifiers, equalizers, or any other audio reproduction circuitry.

To support audio playback through the audio reproduction system 708, the memory 120 includes an audio Codec 720. The audio codec 720 may be an MP3 codec, WMV codec, or other audio codec. The controller 706 retrieves the audio data 722 (e.g., an MP3 file) and reproduces the encoded music through the audio reproduction system 708. The operator interface 724 provides buttons, switches (e.g., a trigger switch), touch sensitive inputs, or other interface mechanisms for the operator to control any function of a device, including to start, stop, pause, record, or delete songs; to start and stop voice recording, to start and stop FM radio recording; to set or modify device parameters; and take other actions. The controller 706 may monitor the operator interface to determine when certain buttons are pressed which indicate that an operation is active (e.g., voice recording). Additionally, the controller 706 is aware of the operational state of the player 700. In other words, the controller 706 knows when a device operation is occurring, such as playing a song, recording voice, or the like, and may delay turning disconnecting batteries from the device until the operation is complete, even if the battery levels should fade below the cutoff threshold 122.

Meanwhile, the energy source monitoring program 128 monitors the batteries in a energy source input 702. Accordingly, the controller 706 determines a cut off condition depending on the cut off threshold 122. Nevertheless, the controller 706 may allow a current operation of the portable music device to complete before turning off the main power switch 704. For example the controller 706 may allow a song to complete playing through the audio reproduction system 708. Alternatively, the controller 706 may allow the operator to complete programming a playlist, complete setting optional parameters, complete recording a voice message (e.g., while a recording switch is depressed) or taking any other actions before opening the main power switch 704. The controller 706 may control the indicators 710 as noted above to alert the operator of the current battery status. The indicators of 710 need not be LEDs, however. Instead, for example, the indicators may appear on an LCD screen or other type of display included with the audio player 700.

With regard to the audio player 700, the controller 706 allows the audio player to continue operation for an extension time even after the battery levels have fallen below the cut off threshold 122. The extension time may correspond to the amount of time needed to finish playing a song, to allow an operator to finish setting parameter settings, to allow the audio player to finish capturing a voice recording, or to allow the audio player to take any other action. Alternatively, the extension time may be preconfigured as a set duration such as 10 seconds, 30 seconds, or one minute.

Figure 8:
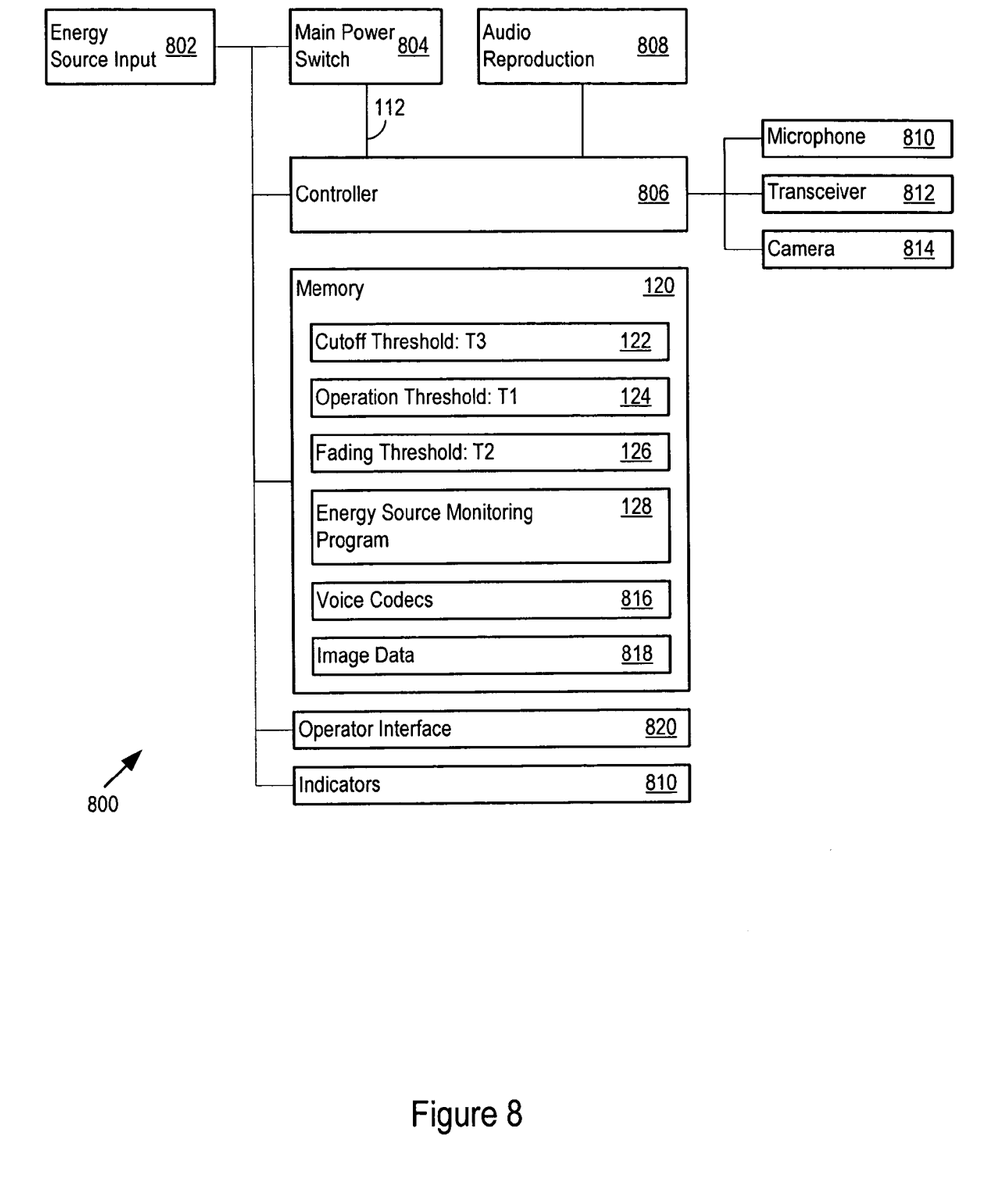
FIG. 8 shows a cellular phone incorporating an energy source monitoring system.

FIG. 8 shows an example of a cellular phone 800 which incorporates an energy source monitoring and control system. The cellular phone 800 accepts power from the energy source input 802 which is connected to the controller 806 and a main power switch 804 (e.g., a dropout switch). An audio reproduction system 808 connects to the controller 806. The audio reproduction system 808 may include a speaker, amplifier, or other audio reproduction circuitry for listening to phone conversations. In addition, the cellular phone 800 may include a microphone 810, a transceiver 812, and a camera 814.

To encode and decode voice, the memory 120 includes voice codecs 816. The memory 120 may also store image data 818 such as images obtained from the camera 814. The energy source monitoring program 128 monitors the batteries in the energy source input 802. Accordingly, the controller 806 determines a cut off condition depending on the cut off threshold 122. Nevertheless, the controller 806 may allow a current operation of the cellular phone 800 to complete before turning off the main power switch 804. For example, the controller 806 may allow a voicemail to finish playing. Alternatively, the controller 806 may allow the operator, using the operator interface 820, to complete setting cellular phone preferences, such as uploading a ring tone, or take other actions before opening the main power switch 804. The controller 806 may control the indicators 810 as noted above to alert the operator of the current battery status. The indicators of 810 need not be LEDs, however. Instead, for example, the indicators may appear on an LCD screen or other type of display included with the cellular phone 800.

More generally, the energy source monitoring and control system allows the cellular phone 800 to continue operation for an extension time even after the energy source no longer meets the cut off threshold 122. The extension time may correspond to the amount of time needed to finish playing a song, to allow an operator to finish setting parameter settings, to allow the cellular phone 800 to receive a voicemail, to send a voicemail, to send a picture, to receive a picture, to capture or play a video, to capture or play a sound, or taken any other action. To that end, the controller 806 may monitor function switches in the operator interface which control device functions. Alternatively, the extension time may be a parameter set in the phone 800, such as a duration between 1 second and 60 seconds.

Although the examples above described a portable music device 700 and cordless telephone 800, it is noted that the energy source monitoring and control system 100 is applicable to any other type of device. As examples, the system 100 may be incorporated into portable gaming devices, personal digital assistances, wireless email devices, clocks, radios, flashlights, or other computer peripherals. Accordingly, the energy source monitoring and control system may delay removing power from the device until a particular device operation is complete, while providing energy source fading warnings, and may prevent device restart until the energy source is replenished. For example, the system may await the completion of an alarm setting operation in a clock, the release of an illumination switch on a flashlight, the recording of a voice file, the completion of a song on a radio, or any other operation. The extension time may persist while any device operation switch, such as a voice recording switch, is depressed (e.g., held down to record voice), until an operational switch is pressed (e.g., a switch which ends a voice recording, or exits a parameter setting menu), may be a predetermined time, or may be determined in other manners. When the extension time ends, the energy source monitoring program 128 may then disengage the main power switch using the switch state control input 112, and prevent device restart until the energy source meets the criteria established by the operation threshold 124.

While various implementations have been described, it will be apparent to those of ordinary skill in the art that many more embodiments and implementations are possible. For example, there may be more than two energy sources (e.g., batteries) in series, and each may be monitored with regard to the thresholds noted above, or additional or different thresholds, to determine when to allow device operation, when to warn the operator about fading battery voltage, and when to automatically disconnect the energy sources from the load. While the controller 110 and energy source monitoring program 128 provide one implementation of voltage measurement logic, comparison logic, and switch control logic, the logic may be implemented in many different ways. As examples, separate analog to digital converters may provide the voltage measurement logic, comparators may provide the comparison logic, and discrete analog or digital circuitry (e.g., a state machine implemented with discrete circuitry or in a FPGA) may provide the switch control logic and the tool restart logic. The LED indicators may be replaced or supplemented with an LCD or other information display. The energy source monitoring program 128 be a single program or may be divided into separate programs. Accordingly, the invention is not to be restricted except in light of the attached claims and their equivalents.

We claim:

1. A power tool energy source monitoring and control system comprising:
    a main power switch operable to connect series connected voltages V1 and V2 to a power tool motor voltage input;
    a switch state control input coupled to the main power switch;
    voltage measurement logic operable to determine V1 and V2;
    comparison logic in communication with the voltage measurement logic, the comparison logic operable to determine a cutoff condition when V1, V2, or both V1 and V2 fade below a cutoff threshold for disconnecting the voltages V1 and V2 from the power tool motor voltage input; and
    switch control logic in communication with the comparison logic, the switch control logic operable to use the switch state control input to hold the main power switch in an 'ON' state for an extension time despite determination of the cutoff condition, then releasing the main power switch to the 'OFF' state.

2. The power tool energy source monitoring and control system of claim 1, where:
    the extension time is a completion time of an existing power tool operation.

3. The power tool energy source monitoring and control system of claim 2, further comprising:
    a trigger switch which initiates power tool operation, and where:
    the tool operation completion time ends when the trigger switch state changes from 'ON' to 'OFF'.

4. The power tool energy source monitoring and control system of claim 3, where the switch control logic is operable to use the switch state control input to change the main power switch to an 'OFF' state after the trigger switch state changes to 'OFF', and is further operable to prevent reconnection of V1 and V2 for power tool restart until V1 and V2 rise above an operation threshold for allowing a power tool motor to start.

5. The power tool energy source monitoring and control system of claim 4, where the voltage measurement logic comprises a first voltage divider across both V1 and V2 in series and a second voltage divider across V2.

6. The power tool energy source monitoring and control system of claim 4, where the operation threshold comprises a predetermined percentage of a nominal energy source voltage for allowing the power tool motor to start.

7. The power tool energy source monitoring and control system of claim 1, where the cutoff threshold comprises a predetermined percentage of a nominal energy source voltage for disconnecting the voltages V1 and V2 from the power tool motor voltage input.

8. The power tool energy source monitoring and control system of claim 1, comprising a controller which implements the voltage measurement logic, the comparison logic, and the switch control logic.

9. A method for power tool energy source monitoring and control, the method comprising:
    providing a switch state control input coupled to switch control logic and to a main power switch which connects series connected voltages V1 and V2 to a power tool motor voltage input;
    measuring V1;
    comparing the measured V1 to a cutoff threshold;
    measuring V2;
    comparing the measured V2 to the cutoff threshold;
    determining a cutoff condition when at least one of the measured V1 and the measured V2 fade below the cutoff threshold for disconnecting V1 and V2 from the power tool motor voltage input; and
    holding the main power switch in an 'ON' state using the switch state control input for an extension time despite the cutoff condition, then releasing the main power switch to the 'OFF' state.

10. The method of claim 9, where holding comprises:
    holding the power switch in the 'ON' state until a trigger switch is released.

11. The method of claim 9, where holding comprises:
    maintaining a main power dropout switch in an 'ON' state.

12. The method of claim 9, further comprising:
    illuminating a warning indicator when at least one of the measured V1 and the measured V2 has faded below the cutoff threshold.

13. The method of claim 9, further comprising:
    preventing reconnection of the series connected voltages V1 and V2 until the measured V1 and the measured V2 rise above an operation threshold.

14. The method of claim 9, further comprising:
    determining when at least one of the measured V1 and the measured V2 fade below a fading threshold, and responsively illuminating a warning indicator.

15. A power tool energy source monitoring and control system comprising:
    a energy source input that accepts series connected voltages V1 and V2;
    a first voltage measurement point coupled to the energy source input;
    a second voltage measurement point coupled to the energy source input;

a main power switch coupled to the energy source input and comprising a switch state control input; and a controller coupled to the first and second voltage measurement points and the main power switch;

a memory coupled to the controller, the memory comprising:

a cutoff threshold for disconnecting the series connected voltages V1 and V2 for stopping power tool operation;

an operation threshold for connecting the series connected voltages V1 and V2 to allow power tool startup;

a fading threshold for determining when voltages V1 and V2 are fading; and an energy source monitoring program operable to:

measure the series connected voltage V1;

measure the series connected voltage V2;

determine when both V1 and V2 exceed the operation threshold and responsively hold the main power Switch in an 'ON' State using the switch state control input;

determine when V1, V2, or both V1 and V2 fade below the fading threshold and responsively illuminate a warning indicator; and determine when V1, V2, or both V1 and V2 fade below the cutoff threshold for disconnecting V1 and V2 to stop power tool operation, and responsively hold the main power switch in an 'ON' state for an extension time using the switch state control input, then releasing the main power switch to the 'OFF' state.

16. The power tool energy source monitoring and control system of claim 15, where the extension time persists while a trigger switch is in an 'ON' state.

17. The power tool energy source monitoring and control system of claim 16, where the, energy source monitoring program is further operable to:

prevent reconnection of V1 and V2 to prevent tool restart until V1 and V2 rise above the operation threshold.

18. The power tool energy source monitoring and control system of claim 15, where the cutoff threshold comprises a predetermined percentage of a nominal energy source voltage for determining when to disconnect the voltages V1 and V2.

19. The power tool energy source monitoring and control system of claim 15, where the operational threshold comprises a predetermined percentage of a nominal energy source voltage for determining when to allow power tool startup.

20. The power tool energy source monitoring and control system of claim 15, where the fading threshold comprises a predetermined percentage of a nominal energy source voltage for determining when to illuminate the warning indicator.

21. The power tool energy source monitoring and control system of claim 15, where the main power switch comprises a dropout switch.

* * * * *